US006378738B1

(12) United States Patent
Speaker et al.

(10) Patent No.: US 6,378,738 B1
(45) Date of Patent: Apr. 30, 2002

(54) SYSTEM FOR FILLING DRYWALL MUD APPLICATORS AND DIVERTER VALVE FOR SAME

(76) Inventors: William R. Speaker; William H. Speaker, both of 4317 Milldaun Rd., Louisville, KY (US) 40213; Joseph M. Miller, 4022 Summer Pl., New Albany, IN (US) 47150

( * ) Notice: Subject to any disclaimer, the term of this patent is extended or adjusted under 35 U.S.C. 154(b) by 0 days.

(21) Appl. No.: 09/629,488

(22) Filed: Jul. 31, 2000

(51) Int. Cl.[7] .................................................. B28C 7/02
(52) U.S. Cl. ...................................... 222/330; 222/401
(58) Field of Search ................................. 222/330, 401

(56) References Cited

U.S. PATENT DOCUMENTS

| | | | |
|---|---|---|---|
| 1,725,337 A | * 8/1929 | Burkhard | 137/876 |
| 4,173,234 A | 11/1979 | Thomas et al. | 137/625.47 |
| 4,187,882 A | 2/1980 | Watson | 137/625.47 |
| 4,403,626 A | * 9/1983 | Paul, Jr. | 137/68.25 |
| 4,465,259 A | * 8/1984 | Allen et al. | 251/304 |
| 4,982,760 A | 1/1991 | Mustaklem | 137/559 |
| 4,997,007 A | 3/1991 | Nieman et al. | 137/625.47 |
| 5,070,910 A | 12/1991 | Mothersbaugh et al. | 137/625.47 |
| 5,072,758 A | 12/1991 | Krambrock | 137/625.47 |
| 5,188,149 A | 2/1993 | Williams | 137/625.47 |
| 5,690,135 A | 11/1997 | Dehais | 137/79 |
| 5,730,819 A | * 3/1998 | Retti | 156/71 |
| 5,810,956 A | 9/1998 | Thanis et al. | 156/71 |
| 5,853,584 A | 12/1998 | Solbakke et al. | 210/390 |
| 5,863,146 A | 1/1999 | Denkins et al. | 401/188 |
| 5,878,925 A | * 3/1999 | Denkins et al. | 222/608 |
| 5,902,451 A | 5/1999 | O'Mara et al. | 156/57 |
| 5,944,055 A | 8/1999 | Dickey | 137/625.47 |
| 6,116,769 A | * 9/2000 | DeWall | 366/43 |
| 6,161,954 A | * 12/2000 | DeWall | 366/43 |

* cited by examiner

Primary Examiner—John Fox
(74) Attorney, Agent, or Firm—Maurice L. Miller, Jr.

(57) ABSTRACT

A system for supplying drywall mud in a viscous, flowable, semi-liquid form from a container for alternately filling at least two different types of drywall mud applicator devices is disclosed. The system includes a hand pump having a body partially disposed in a quantity of drywall mud in an open top container and a two way diverter valve having an inlet port attached to a discharge port on an upper end of the pump and the two outlet ports. One of the valve outlet ports is connected to a gooseneck tube for filling a bazooka type of drywall mud applicator and tape dispensing device. The other of the valve outlet ports is adapted for connection to a charging port of conventional corner box type drywall mud applicator device. A switch on a housing of the valve switches the valve inlet ports alternately into and out of communication with each of the valve outlet ports for alternately filling both types of applicator device without need for modifying the system. A two-way diverter valve for handling drywall mud when in a viscous, flowable, semi-liquid state is also disclosed.

5 Claims, 5 Drawing Sheets

SYSTEM FOR FILLING DRYWALL MUD APPLICATORS AND DIVERTER VALVE FOR SAME

BACKGROUND OF THE INVENTION

This invention relates to a system for alternately filling two different types of drywall mud or wall board joint compound applicator devices in a single system set up and a diverter valve for the system which is adapted to handle drywall mud in a viscous, semi-liquid state ready for application to seams and to taped seams between adjacently disposed drywall panels.

Systems for delivering moist, flowable joint compound under pressure from an open top container to a single type of joint compound applicator device have long been known and used in the prior art. One such prior art system includes a manually operable hand pump having a lower body portion disposed in a container of viscous, semi-liquid joint compound and a tube known as a gooseneck having an upper inlet end connected directly to a discharge port on an upper body portion of the pump. A lower end portion of the tube rests on a floor and has an upwardly opening outlet end into which a charging port of a conventional bazooka type of drywall applicator device can be inserted for filling preparatory to using the bazooka to fill a seam between adjacently disposed drywall panels with drywall mud followed by applying a tape strip along and over the seam.

To operate the prior art system, a pump handle of the pump is manually operated to pump drywall mud from the container directly through the gooseneck and, thence, into a lower end of the bazooka. The filled bazooka is then removed from the outlet end of the gooseneck and is used to fill and tape the seams between adjacent drywall panels until the drywall mud containing barrel of the bazooka is empty, or nearly so, at which point it must be recharged. After recharging the bazooka and continuing on with the filling and taping of seams, it is desirable to charge or fill other types of drywall mud applicator devices such as flat boxes, for use in applying successive layers of mud to flat seams that have already been filled and taped with the bazooka in order to conceal the tape and level or even out the seam so as to effectively hide it from view on the finished wall. Also, after recharging the bazooka, and continuing on with that work, it is desirable to fill corner boxes with drywall mud for use in filling in and leveling and smoothing out inside right angle corners and in covering the tape strip previously applied thereover with the bazooka.

A problem encountered with such filling systems for drywall mud applicator devices is that, once the bazooka has been filled, it is necessary to disconnect the gooseneck from the pump in order to attach a corner box adapter to pump discharge port for filling of the corner box. In order to fill the flat box, a so-called T-adapter must be inserted into the corner box adapter now on the pump discharge port. After filling the corner box and/or the flat box as necessary, the corner box adapter must then be removed from the pump discharge port and the gooseneck must be reattached in order to thereafter refill the bazooka.

The successive breaking down and modifying of the prior art system to alternately accommodate the bazooka for filling and, then, the flat and corner boxes for filling is both time consuming and messy. Indeed, it would be desirable to have a system for supplying drywall mud to fill the bazooka and, then, the flat and corner boxes without having to continually remove and replace the gooseneck and corner box adapter.

By means of our invention, these and other difficulties encountered using prior art systems for alternately filling bazooka and box type drywall mud applicator devices is substantially eliminated.

SUMMARY OF THE INVENTION

It is an object of our invention to provide a system for supplying drywall mud in a viscous, semi-liquid state from a container for alternately filling at least two different types of drywall mud applicator devices.

It is a further object of our invention to provide such a system that permits the alternate filling of bazooka and box type drywall mud applicator devices without the necessity of removing and reinstalling a gooseneck tube and corner box adapter from and in the system.

It is another object of our invention to provide a two-way diverter valve for handling mud when in a viscous, semi-liquid state ready for application to seams and to taped seams between adjacently disposed drywall panels.

Briefly, in accordance with our invention, there is provided a system for supplying drywall mud in a viscous, semi-liquid state from a container for alternately filling at least two different types of drywall mud applicator devices. The system includes a pump adapted for placement at least partially within a quantity of drywall mud disposed in a container for pumping the drywall mud from the container to a drywall mud applicator device. The system further includes a diverter valve adapted for handling drywall mud including a housing, an inlet port connected to a discharge port of the pump, and at least two outlet ports which are alternately switchable into and out of communication with the valve inlet port. Each of the valve outlet ports is adapted for communication with a different type of drywall mud applicator device for alternately filling each said device.

These and other objects, features and advantages of the present invention will become apparent to those skilled in the art from the following detailed description and attached drawings upon which, by way of example, only a preferred embodiment of our invention is illustrated.

DESCRIPTION OF THE PREFERRED EMBODIMENT

Figure 3:
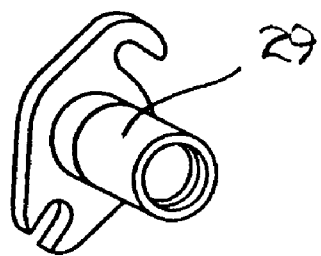
Figure 4:
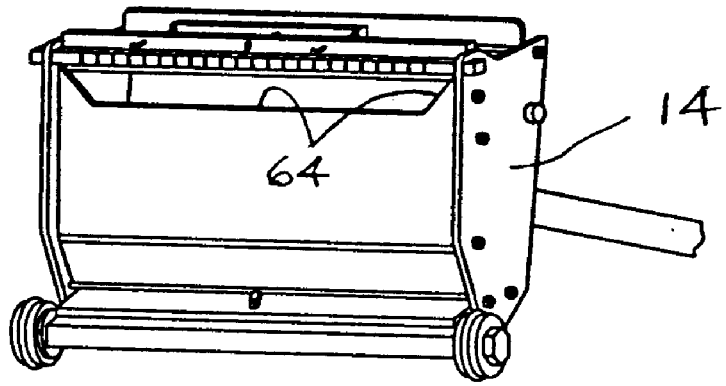

Referring now to the drawings figures, there is shown, in a preferred embodiment of our invention, a system, generally designated 10, for delivering drywall joint compound, sometimes referred to as drywall mud, in a moist, semi-liquid form, to various conventional applicator devices. One of such applicator devices is known in the trade as a bazooka 12 (FIG. 1), and comprises an elongated, hand held device conventionally used to apply drywall mud along a seam between adjacent drywall panels and to immediately thereafter, apply a tape strip over the seam, all in a single pass of a discharge port of the bazooka along and over the seam. Another of such applicator devices is a flat box 14 (FIG. 4) which is used to cover the tape strip, as applied over a flat seam between two adjacent drywall panels lying in a single plane, with drywall mud. Yet another of such devices is a corner box 16 (FIG. 3) which is used to apply drywall mud to cover a tape strip which seals a seam along an inside corner between two adjacent drywall panels disposed at right angles to one another.

Figure 1:
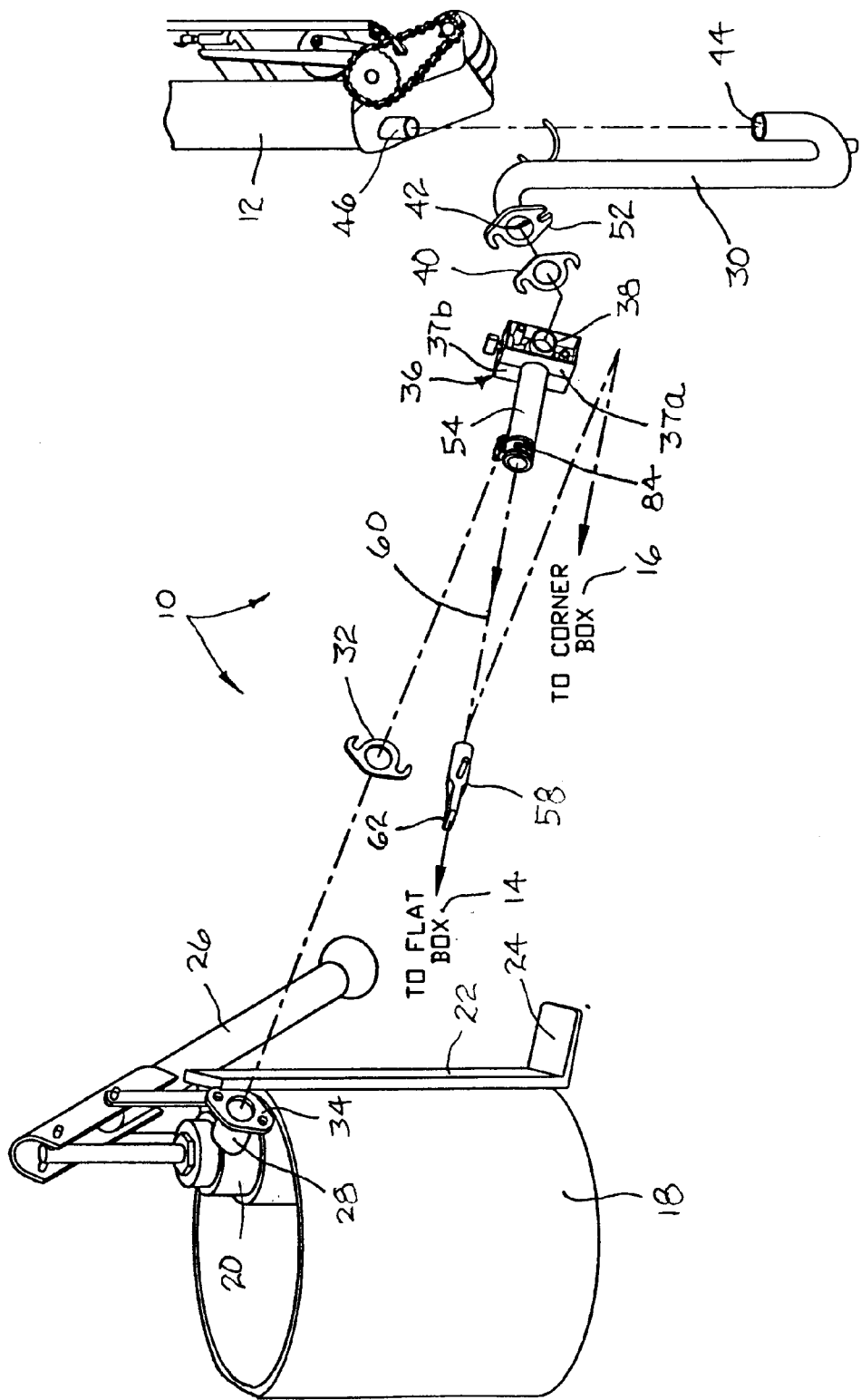
FIG. 1 shows an exploded perspective view of a drywall joint compound delivery system for use in filling various joint compound applicator devices, thus illustrating a preferred embodiment of our invention.

First, a batch of drywall mud is prepared to a proper consistency in a suitable open top container or bucket 18 for application to drywall in a manner well known in the prior art Next, the body of a conventional drywall hand pump 20 is lowered into the drywall mud disposed in the container 18. A conventional brace or bracket 22 attached to an upper end portion of the pump 18, hangs over an outside surface of the container 20 as shown in FIG. 1. The bracket 22 contains a foot plate 24 which is held down against a container supporting surface by a foot of a worker to stabilize the container 18 while a pump handle 26 is operated to deliver drywall mud to a pump discharge port 28.

Figure 6:
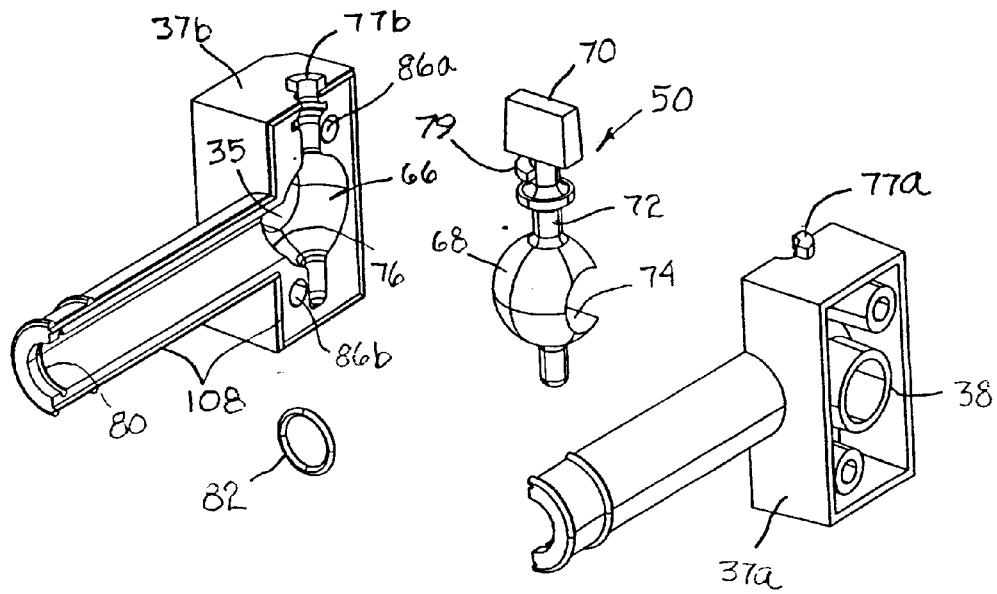
FIG. 6 shows an exploded perspective view of the diverter valve of FIGS. 1 and 5.

In the prior art, drywall mud is conventionally delivered from the pump discharge port 28 directly to a tube known as a gooseneck 30 in order to fill the bazooka 12. But, to thereafter fill boxes 14 and 16, the gooseneck 30 must first be disconnected from the pump discharge port 34 and the adapter 29 must then be attached to the port 34. In our system, the drywall mud is delivered from the pump discharge port through a gasket 32, which is shaped to conform and attach to a flange 34 on the pump discharge port 28, to one side port 35 (See FIG. 7) of a two-way drywall mud diverter valve, generally designated 36. A side port 38 on an opposite side of the diverter valve 36 from the side port 35 is connected through a gasket 40 (FIG. 1) to an inlet end 42 of the gooseneck 30. An outlet end 44 of the gooseneck delivers drywall mud upwardly to an inlet port 46 of the bazooka 12 to fill the latter when a valve gate, generally designated 50, of the diverter valve 36 is positioned as shown in FIG. 6. The gasket 32 is fastened against the pump discharge port flange 34 with suitable treaded fasteners such as machine screws and hex nuts. The gasket 40 is shaped to conform to a flange 52 on the inlet end 42 of the gooseneck 30 and is likewise, fastened to the flange with suitable threaded fasteners, such as machine screws and hex nuts.

Figure 2:
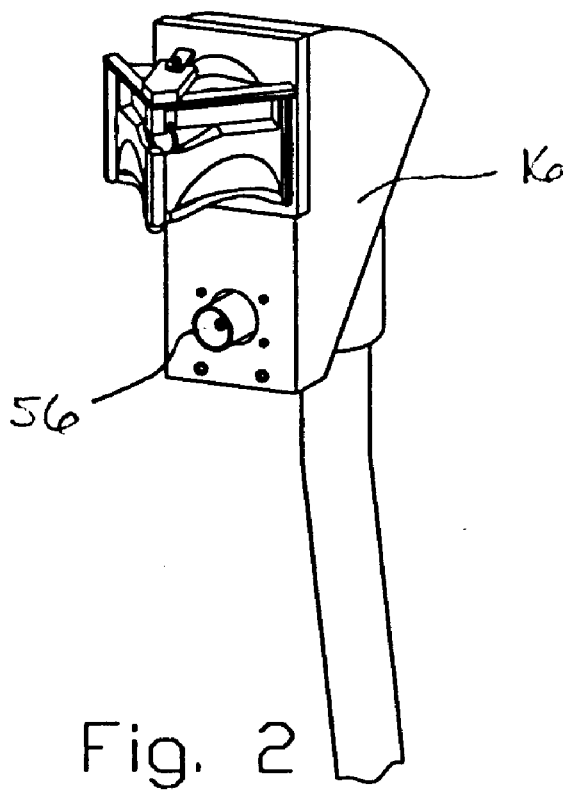
FIGS. 2–4 show perspective views of a corner box, a pump outlet port adapter and a flat box, respectively, all being prior art devices used in and with conventional drywall joint compound delivery systems.
Figure 7:
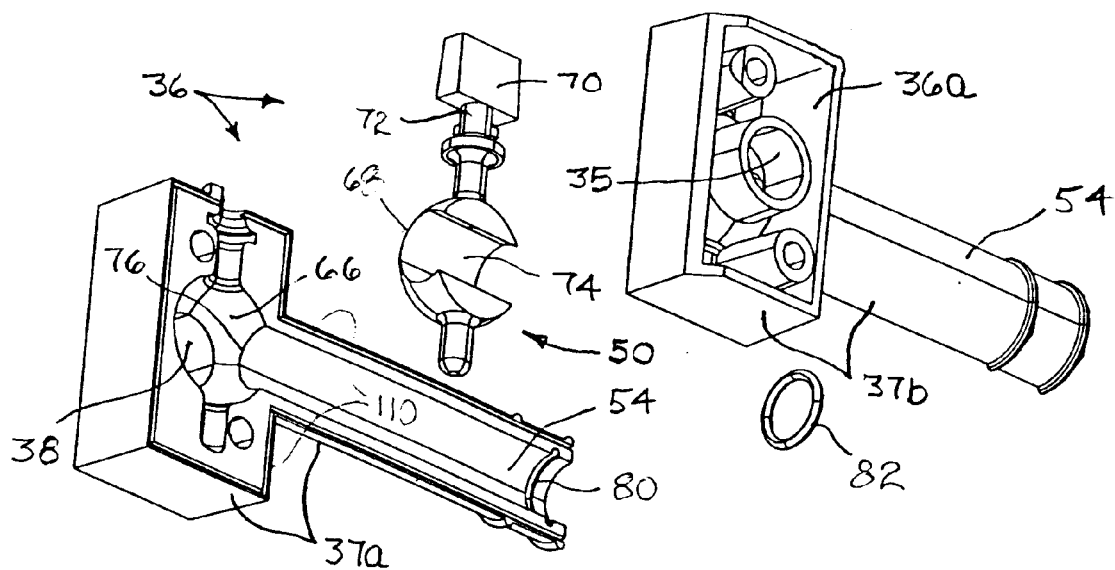
FIG. 7 shows an exploded perspective view of the diverter valve of FIGS. 1 and 5–6 as viewed from a different direction as viewed in FIG. 6 and with a valve gate component thereof being rotated ninety degrees on its longitudinal axis from its position as shown in the latter mentioned figure.
Figure 8:
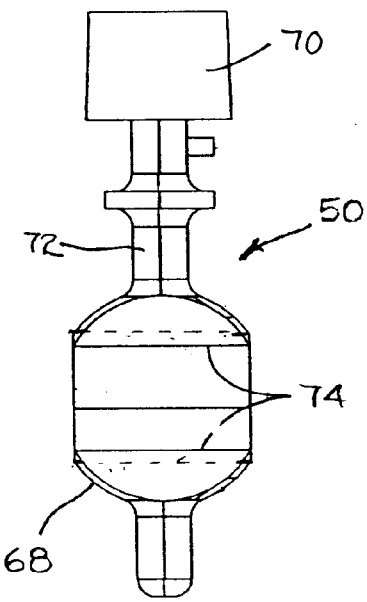
FIGS. 8–9 show longitudinal views of the valve gate of FIGS. 1 and 5–7 with valve gate of FIG. 9 being rotated ninety degrees on its longitudinal axis from its orientation as shown in FIG. 8.
Figure 9:
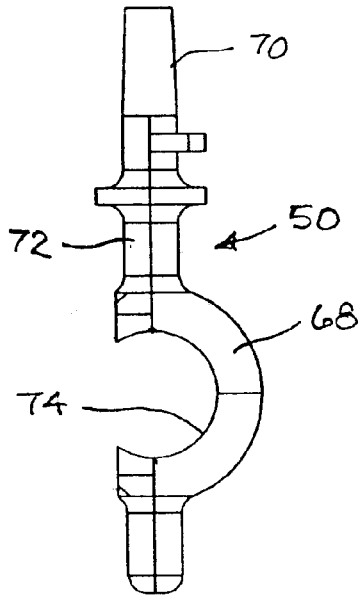

With the valve gate 50 turned as shown in FIG. 7, the path of flow of drywall mud through the valve 36 is from the side port 35 into an elongated outlet tube 54 which is sized to closely fit onto an inlet port 56 (FIG. 2) of the corner box 16. Accordingly, either before or after filling the bazooka 12 through the gooseneck 30, the valve gate 50 is simply rotated ninety degrees from that filling position, to permit directly connecting the corner box 16 to the outlet tube 54 for filling of the corner box with drywall mud from the pump 20 through the diverter valve 36. To fill the conventional flat box 14, a conventional flat box adapter 58 (See FIG. 1) is inserted into an outer end of the outlet tube 54 as indicated by a centerline 60, the opposite end 62 of which is inserted into an elongated slot 64 (See FIG. 4) of the flat box. Again, the valve gate 50 is positioned as in FIG. 7 for drywall mud flow from the side port 35 to the outlet tube 54.

Figure 5:
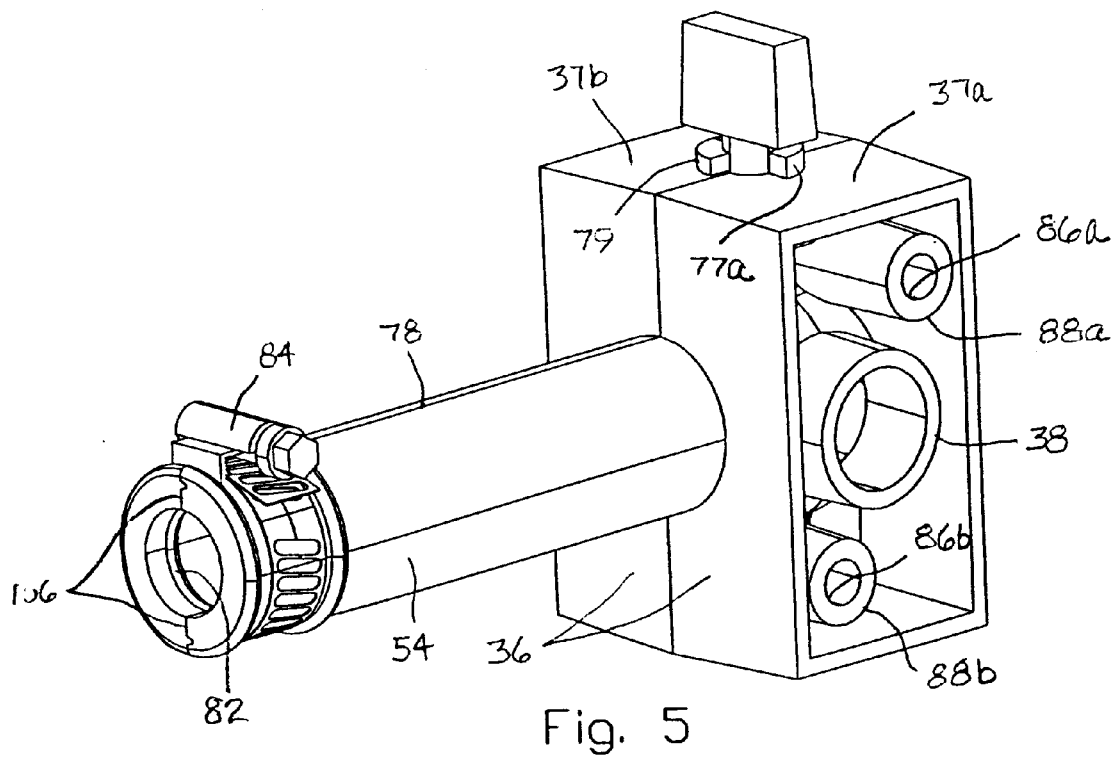
FIG. 5 shows a perspective view of a two-way diverter valve, the same as employed in the delivery system of FIG. 1.

The diverter valve 36 is preferably constructed of a suitable molded plastic such as, for an example, polyvinylchloride or a suitable metal. In the preferred embodiment of our invention, the mating valve 36 includes a housing having two mating portions 37a and 37b, as seen in FIGS. 6 and 7. Each of the portions 37a and 37b contains a semi-spherical interior portion 66 which, when mated together as shown in FIG. 5, form a spherically shaped hollow seat closely conforming to and around a ball shaped portion 68 of the valve gate 50. A handle 70 formed on one end of a stem 72 permits the valve gate 50 to be rotated so as to rotate the ball shaped portion 68 in the valve seat. The ball shaped portion 68 contains a hollow partially cylindrically shaped passage 74 which is opened along one side thereof. With the valve gate 50 positioned as shown in FIG. 7, drywall mud is pumped into the side port 35 and into the open side of the passage 74 in the ball portion 68 from whence it is directed into the outlet tube 54 for direct filling of the corner box 16 or for filling of the flat box 14 through the adapter 58. But with the ball portion 68 of the valve gate 50 positioned as shown in FIG. 6, drywall mud from the pump 20 is introduced into the side port 35 and travels along the passage 74 to the side port 38 for introduction to the gooseneck 30 and, ultimately, to the bazooka 12. Positioned as shown in FIG. 6, the spherical side of the ball shaped portion 68 blocks an entrance 76 to the outlet tube 54.

Referring to FIG. 6, a pair of arc shaped stops 77a and 77b are attached to the upper surfaces of the positions 37a and 37b, respectively. Each of these stops 77a and 77b subscribes a ninety degree arc around the valve gate stem 72 (or 92 of FIGS. 10–11 as the case may be) with the stop 77a occupying a first quadrant and the stop 77b occupying a fourth quadrant as viewed in FIG. 6. A similar ninety degree arc shaped stop 79 is fixedly mounted on the valve gate stem 72 so that it can be reciprocally moved, rotationally, between a third quadrant, which it occupies in FIG. 6 abutting the fixed stop 77b, and a second quadrant abutting the fixed stop 77a. This arc shaped stop mechanism assures that the ball shaped portion 68 can only be rotated 90 degrees in alternate directions to assure proper alignment of the passage 74 with the valve ports 35 and 38 when rotated as shown in FIG. 6 and to assure proper alignment of the open side of the passageway 74 with the valve port 38 and, simultaneously, proper communication between one end of the passageway 74 and the outlet tube 54 when the stem 72 is rotated to the position as shown in FIG. 7.

A groove 80 is provided in the outlet tube 54 near the free end of the outlet tube to provide a leak resistant seal around the inlet port 56 of the corner box 16 (See also FIG. 2) and around the inlet port of the flat box adapter 58 (See also FIG. 1). A conventional loop clamp 84 is then tightened over the outside of the tube 54 over and around the o-ring 82. When the two portions 37a and 37b are assembled, as shown in FIG. 5, the portions can be secured tightly together with a pair of suitable nuts and bolts, the shanks of which bolts extend through hollow open ended shafts 86a and 86b in a pair of collars 88a and 88b, respectively, in both portions.

To seal the valve portions 37a and 37b to prevent leakage of drywall mud through the resulting seams, a tongue and groove arrangement 106 is used as shown in FIG. 5. Along the perimeter of 14<the valve portion 37b a tongue 108 is formed, as best shown in FIG. 6, and along the opposing perimeter of the valve portion 37a, a conforming groove 110 is formed, as shown best in FIG. 7.

Figures 10, 11:
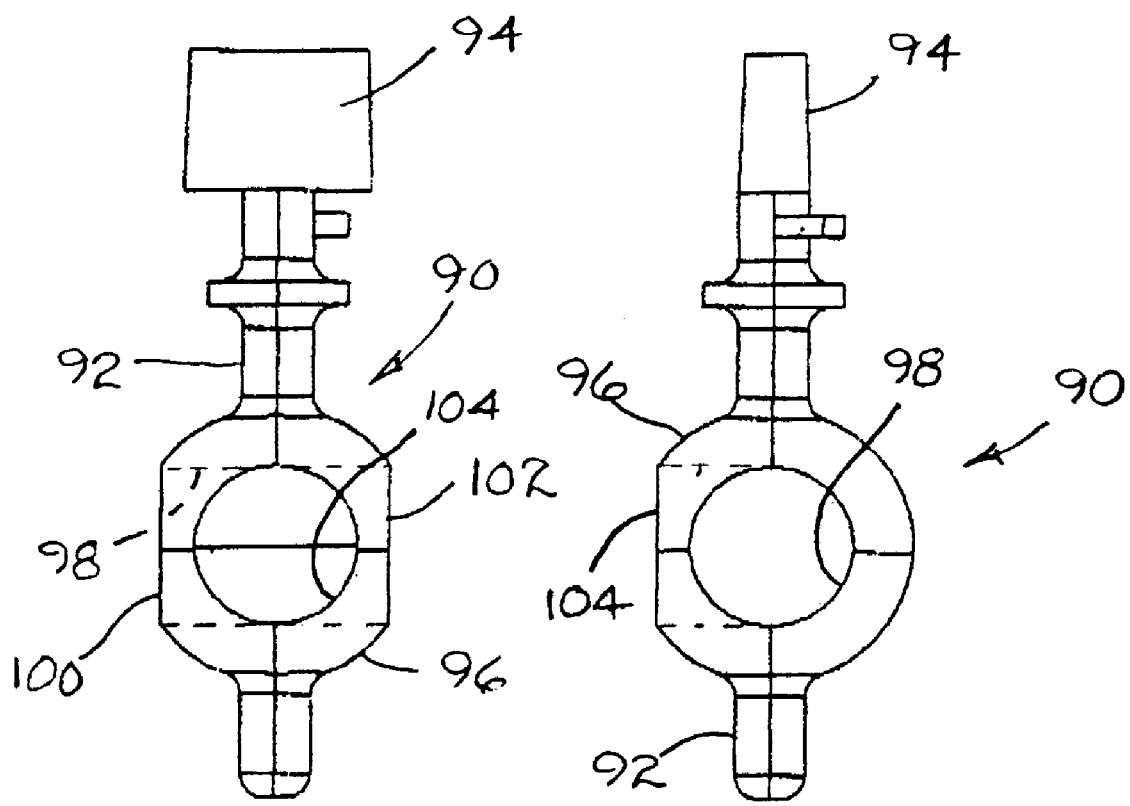
FIGS. 10–11 show longitudinal views of an alternative form of valve gate for use in the valve of FIGS. 1 and 5–7, the valve gate of FIG. 11 being rotated ninety degrees on its longitudinal axis from its orientation as shown in FIG. 10.

Referring now to FIGS. 10–11, there is shown an alternative valve gate, generally designated 90, which can be used in the valve 36 of the previous example in place of the valve gate 50. The gate 90 is manually rotatable on its longitudinal axis, which extends through a stem 92, by means of a handle 94. A ball shaped portion 96 is adapted to rotate within the semi-spherical portions 66 of the housing portions 37a and 37b of FIGS. 6–7 when the housing portions are adjoined over the ball shaped portion similar to FIG. 5. The portion 96 contains a hollow cylindrical shaped passage 98 therethrough having openings 100 and 102 on opposite sides thereof as shown in FIG. 10. A third opening 104 communicates with a central portion of the passageway 98 (See FIG. 11). Accordingly, the valve gate 90 permits passage of drywall mud straight through the passage 98 from one to the other of the openings 100 and 102 to feed mud from the pump discharge port 28 to the gooseneck 30 when properly positioned in the valve 36 of FIG. 1. When the valve gate 90 is turned ninety degrees from that position on its longitudinal axis, the pump discharge port 28 will then communicate through the opening 104 to one of the ports 100 or 102 with the tube 54. Accordingly, the alternative valve gate 90 also permits filling of either the gooseneck 30 or the boxes 14 and 16 depending upon a simple manual adjustment of the valve handle 99 and stem 92.

Although the present invention has been described with respect to specific details of a certain preferred embodiment thereof, it is not intended that such details limit the scope and coverage of this patent other than as specifically set forth in the following claims, taking into account reasonable equivalents thereof.

We claim:

1. A system for supplying drywall mud in a viscous, semi-liquid state from a container for alternatively filling at least two different types of drywall mud applicator devices, the system comprising a manually operable hand pump adapted for placement at least partially within a quantity of drywall mud disposed in a container for pumping said drywall mud from the container to a drywall mud applicator device; and a diverter valve adapted for handling drywall mud including a housing, an inlet port connected to a discharge port of said pump and at least two outlet ports which are alternately switchable into and out of communication with said valve inlet port, each of said outlet ports being adapted for communication with a different one of said applicator devices for alternately filling said devices with drywall mud from the container, said valve being located at a position sufficiently close to said pump to permit one person to manually operate said pump and simultaneously fill either one of said applicator devices.

2. The system of claim 1 further comprising a gooseneck tube of the type used for filling a bazooka type drywall mud and tape applicator device, an inlet end of said gooseneck tube being connected to a first of said valve outlet ports, a second of said valve outlet ports being adapted for connection directly to a corner box type drywall mud applicator device.

3. The system of claim 1 wherein said valve inlet port and a first one of said valve outlet ports are aligned with one another, and projecting outwardly from opposite sides of said valve housing, a second one of said valve outlet ports being an elongated cylindrically shaped hollow tube projecting outwardly from a front face of said valve housing perpendicular to the alignment of said inlet port and said first one of said outlet valves, said housing containing a hollow, spherically shaped central chamber disposed between and communicating with said valve inlet port and said valve outlet ports, said valve further comprising a valve gate comprising a partially spherical element sized to closely, yet slidably fit within said central chamber, said element containing a partially cylindrically shaped passageway opening on opposite sides of the element, one side of said element being truncated such that said passageway is open along one side thereof, said element being formed on a stem so as to be rotatable in said chamber about an axis through said stem, to cause said valve inlet port to alternately communicate with said valve outlet ports.

4. The system of claim 1 wherein one of said valve outlet ports comprises an elongated hollow tube projecting outwardly from a face of said valve housing which is sized to fit closely onto an inlet port of conventional corner box type applicator device for filling said corner box applicator device.

5. The system of claim 4 wherein said elongated hollow tube is also sized to closely receive into a free open end thereof a conventional flat box adapter for insertion into an elongated slot of a conventional flat box applicator device for filling said flat box applicator device.

* * * * *